United States Patent
Aragon (10) Patent No.: US 11,495,050 B2
(45) Date of Patent: Nov. 8, 2022

(54) METHOD FOR DISTINGUISHING A REAL THREE-DIMENSIONAL OBJECT FROM A TWO-DIMENSIONAL SPOOF OF THE REAL OBJECT

(71) Applicant: Identy Inc., Dover, DE (US)

(72) Inventor: Jesus Aragon, Dover, DE (US)

(73) Assignee: Identy Inc., Dover, DE (US)

( * ) Notice: Subject to any disclaimer, the term of this patent is extended or adjusted under 35 U.S.C. 154(b) by 0 days.

(21) Appl. No.: 17/050,184

(22) PCT Filed: May 9, 2019

(86) PCT No.: PCT/IB2019/053824
§ 371 (c)(1),
(2) Date: Oct. 23, 2020

(87) PCT Pub. No.: WO2019/207557
PCT Pub. Date: Oct. 31, 2019

(65) Prior Publication Data
US 2021/0103749 A1 Apr. 8, 2021

(30) Foreign Application Priority Data
Apr. 27, 2018 (EP) .................................... 18382295

(51) Int. Cl.
*G06V 40/12* (2022.01)
*G06T 7/90* (2017.01)
(Continued)

(52) U.S. Cl.
CPC ....... *G06V 40/1365* (2022.01); *G06K 9/6217* (2013.01); *G06N 3/04* (2013.01);
(Continued)

(58) Field of Classification Search
CPC .............. G06V 40/1365; G06V 10/17; G06V 40/1318; G06T 7/90; G06T 7/70;
(Continued)

(56) References Cited

U.S. PATENT DOCUMENTS

| 10,108,871 B2 | 10/2018 | Derakhshani et al. |
| 10,121,059 B2 | 11/2018 | Yoo et al. |
| 2007/0253604 A1 | 11/2007 | Inoue et al. |

FOREIGN PATENT DOCUMENTS

| JP | H11-339048 A | 12/1999 |
| JP | 2006-259931 A | 9/2006 |

(Continued)

OTHER PUBLICATIONS

Abadi, Martin, et al. "{TensorFlow}: A System for {Large-Scale} Machine Learning." 12th USENIX symposium on operating systems design and implementation (OSDI 16). 2016. (Year: 2016).*

(Continued)

*Primary Examiner* — Utpal D Shah
(74) *Attorney, Agent, or Firm* — Lowenstein Sandler LLP (57) ABSTRACT

A method for distinguishing a real three-dimensional object from a two-dimensional spoof of the real object, the method comprising: obtaining, by an optical sensor of a mobile device, an image containing either the spoof or the real object; providing the image to a neural network; processing the image by the neural network by: calculating at least one of: 1) a distance map representative of the distance of a plurality of pixels to the optical sensor; or 2) a reflection pattern representative of light reflection associated with a plurality of pixels constituting at least a portion of the object within the image; and comparing at least one of the calculated distance map or the calculated reflection pattern with (Continued)

a learned distance map or a learned reflection pattern, to determine that the image contains either the spoof or the real object.

16 Claims, 6 Drawing Sheets

(51) Int. Cl.
*G06T 7/70* (2017.01)
*G06K 9/62* (2022.01)
*G06N 3/08* (2006.01)
*G06N 3/04* (2006.01)
*H04N 5/225* (2006.01)
*G06V 10/10* (2022.01)
*G06V 10/75* (2022.01)
*G06V 20/64* (2022.01)
*G06V 40/40* (2022.01)
*G06V 40/13* (2022.01)
*G06V 40/10* (2022.01)

(52) U.S. Cl.
CPC ............ *G06N 3/08* (2013.01); *G06T 7/70* (2017.01); *G06T 7/90* (2017.01); *G06V 10/17* (2022.01); *G06V 10/751* (2022.01); *G06V 20/64* (2022.01); *G06V 40/1312* (2022.01); *G06V 40/1318* (2022.01); *G06V 40/1347* (2022.01); *G06V 40/40* (2022.01); *H04N 5/2256* (2013.01); *G06T 2207/20021* (2013.01); *G06T 2207/20084* (2013.01); *G06T 2207/30196* (2013.01); *G06V 40/107* (2022.01)

(58) Field of Classification Search
CPC .......... G06K 9/6217; G06N 3/04; G06N 3/08; H04N 5/2256
See application file for complete search history.

(56) References Cited

FOREIGN PATENT DOCUMENTS

| JP | 2018-032391 A | 3/2018 |
|---|---|---|
| KR | 10-2018-0019654 A | 2/2018 |
| WO | 2018106987 | 6/2018 |

OTHER PUBLICATIONS

Chollet, François. "Xception: Deep learning with depthwise separable convolutions." Proceedings of the IEEE conference on computer vision and pattern recognition. 2017. (Year: 2017).*
European Search Report for EP 18382295.6, dated Nov. 15, 2018, 11 pages.
Yousef Atoum et al. "Face Anti-Spoofing Using Patch and Depth-Based CNNs", 2017 IEEE International Joint Conference on Biometrics (IJCB), IEEE, Oct. 1, 2017, pp. 319-328.
Di Tang et al., "Face Flashing: a Secure Liveness Detection Protocol based on Light Reflections", Arxiv.org, Jan. 6, 2018, 16 pages.
Mayank Vatsa, "Deep Learning in Biometrics", CRC—Taylor & Francis, Jan. 1, 2018, pp. 246-297.
Google's TensorFlow (open-source software), Nov. 2015.
International Search Report and Written Opinion for Application No. PCT/IB2019/053824, dated Jun. 17, 2019, 13 pages.
Tang et al., "Face Flashing: a Secure Liveness Detection Protocol based on Light Reflections", Arxiv.org, XP080850899, pp. 1-15, Jan. 6, 2018.
Atoum et al., "Face anti-spoofing", 2017 IEEE International Joint Conference, XP033308629, pp. 319-328, Oct. 1, 2017.
Canadian Office Action dated Nov. 16, 2021, which issued in Canadian Application No. 3,098,286, 3 pages.
Korean Office Action for Patent Application No. 10-2020-7034340, dated Jan. 17, 2022, 7 pages.
Japanese Office action for Patent Application No. 2020-560255, dated Mar. 8, 2022, 8 pages, with English translation.

* cited by examiner

METHOD FOR DISTINGUISHING A REAL THREE-DIMENSIONAL OBJECT FROM A TWO-DIMENSIONAL SPOOF OF THE REAL OBJECT

RELATED APPLICATIONS

This patent application claims the benefit of International Application No. PCT/IB2019/053824, filed May 9, 2019, which claims priority to EP Application No. 18382295.6, filed Apr. 27, 2018, wherein the entire contents of both are hereby incorporated by reference.

FIELD OF INVENTION

The present disclosure relates to a computer implemented method for distinguishing a real three-dimensional object, like a finger of a hand, from a two-dimensional spoof of the real object, and a mobile device implementing this method.

BACKGROUND

Techniques for classifying images or information obtained from the images are already known. However, those methods are not designed or yet applied to distinguishing between an object itself and a spoof of the object. This makes it risky to use objects identified within obtained images for security related issues, like logging in procedures, because the objects might only be spoofs of the real objects.

DETAILED DESCRIPTION

An objective of the present disclosure is to provide a computer implemented method that allows for distinguishing between a real object and a two-dimensional spoof of the real object in an efficient manner while requiring only a minimum of computing resources, thereby allowing for executing the method completely within or by using a mobile device like a smart phone.

This objective is achieved by computer implemented methods for distinguishing a real three-dimensional object, like a finger of a hand, from a two-dimensional spoof of the real object and a mobile device comprising an optical sensor and executing the method according to various embodiments of the present disclosure.

A computer implemented method according to embodiments of the present disclosure for distinguishing a real three-dimensional object, like a finger of a hand, from a two-dimensional spoof of the real object comprises: obtaining, by an optical sensor of a mobile device, an image, wherein the image contains either the spoof or the real object; providing the image to neural network; processing the image by the neural network; wherein processing comprises calculating at least one of: a distance map representative of the distance of a plurality of pixels to the optical sensor, the pixels constituting at least a portion of the object within the image; a reflection pattern representative of light reflection associated with plurality of pixels constituting a least a portion of the object within the image; and wherein processing further comprises comparing, preferably by using the neural network, at least one of the calculated distance map or the calculated reflection pattern with a learned distance map or a learned reflection pattern, thereby determining, based on an outcome of the comparison, that the image contains either the spoof or the real object.

In the context of the present disclosure, even though it would, in principle, be possible that even the image of the real three-dimensional object constitutes a spoof of an intended object like the real finger of a human being, it is assumed that the three-dimensional object will be the real object. A two-dimensional spoof of the real object can be anything but will usually be an image originally taken from the real object and now being provided (for example, a paper or any other flat surfaces) to the optical sensor which, in turn, takes an image of this image. However, other realizations of a two-dimensional spoof like an (almost two-dimensional flat) model of the real object can also be realized. In any case, it is intended that the spoof according to the present disclosure-is not a three-dimensional reproduction of the real object.

The distance map is meant to constitute data structure, like a matrix or a table or other structure, where a given pixel in the original image that was taken by the optical sensor is associated with its estimated or calculated distance to the optical sensor. It is clear that the pixel itself does not have a distance to the optical sensor as the pixel merely is a data structure. What is meant is that the object obtained by taking of the image by the optical sensor originally had a distance to the optical sensor. Therefore, each pixel in the obtained image represents a point in the real world and, therefore, is still associated with a distance of this point in the real world to the optical sensor at the time the image was taken.

The same holds for the reflection pattern representative of light reflection associated with a plurality of pixels constituting at least a portion of the object within the image. Here, it is clear that the pixels themselves do not realize a reflection pattern but the original object (or two-dimensional spoof of the real object) did have a reflection pattern representative of light reflection. This can be calculated based on the image information obtained by the optical sensor. Like for the distance map, the reflection pattern is intended to have the form of a data structure, like a matrix or a two-dimensional table or the like.

It is intended that the calculated distance map is compared with a learned distance map or the calculated reflection pattern is compared with a learned reflection pattern. Herein, the learned distance map and the learned reflection pattern correspond to distance maps and reflection patterns that are known to the neutral network to constitute either a distance map of a real object or a distance map of a two-dimensional spoof of the real object or a reflection pattern of a real object or a reflection pattern of a two-dimensional spoof of the real object. The comparison of the calculated distance map or reflection pattern with the learned distance map or reflection pattern is intended to yield a result that can be used to distinguish between a real object and a spoof of the object by, for example, determining that the obtained distance map or reflection pattern is corresponding more likely to a learned distance map or learned reflection pattern that constitute a spoof rather than a real object.

With the method according to the present disclosure, it is possible to efficiently distinguish between real objects and spoofs of the real objects because neutral networks as used can reliably determine similarities between images taken and learned information (like the learned distance map and the learned reflection pattern) in order to determine specific characteristics associated with the object within the image. Thereby, this method is applicable also in cases where the information in the image with respect to the real object is a security sensitive information like a finger carrying a fingertip that is used for identifying the user, thereby preventing misuse of images taken from such objects.

In one embodiment, the distance map and the reflection pattern are calculated and compared to the learned distance map and the learned reflection pattern, thereby determining, based on the outcome of the comparison, that the image contains either the spoof or the real object. By using both, the calculated reflection pattern and the calculated distance map, the reliability of the determination that the image of the object shows a spoof or the real object can be increased, thereby even further increasing the reliability of the identification and the security in case the identification is further used for security related issues.

In one embodiment, the image is obtained by the optical sensor while using a flash associated with the optical sensor and wherein the optical sensor is a camera. Using the flash of a camera highlights portions of the area from which the image is obtained, thereby allowing for more reliably calculating a reflection pattern with high accuracy and also allowing for more easily distinguishing between spoofs of the real object and the real object.

Furthermore, the neutral network might comprise a plurality of layers and the last layer comprises two nodes, wherein a first node provides output regarding a real object being determined during the processing and the second node provides an output regarding a spoof being determined during the processing.

Within the present disclosure, there is intended that both nodes provide outputs for each image taken regardless of whether it is a real object or a spoof of the real object that is obtained on the image. This output can later on be processed further in order to carry out a probabilistic determination of whether or not the object obtained on the image is either real or a spoof.

According to a more detailed implementation of this embodiment, each node provides an output upon processing of the image, the output ranging from $-\infty$ to $+\infty$ and the output of each node is passed to an output normalizer, the output normalizer first taking the output $x_i$ of each node and calculates a reduced value $S(x_i)$ by $$S(x) = \frac{e^x}{1+e^x}$$

where i=1 for the first node and i=2 for the second node, and provides the values $S(x_i)$ to a normalization function $$\sigma(S(x_j)) = \frac{e^{S(x_j)}}{\Sigma_i e^{S(x_i)}}$$

thereby to obtain normalized values $\sigma(S(x_1)) \equiv \sigma_1$ and $\sigma(S(x_2)) \equiv \sigma_2$. With this further processing of the output of the first node and the second node, it is possible to have normalized values calculated based on the first and second node, thereby allowing for a statistical evaluation of this output of the first and second node for judging whether a spoof or a real object is provided within the image.

In one embodiment, it is determined, if $\sigma_1 > 0.5$, that the image contains the real object and, if $\sigma_2 > 0.5$, it is determined that the image contains the spoof. By using the normalized values of the output of the first and second node, it is possible to reliably distinguish between real object and the spoof.

It is noted that the exponential function is easily implemented in a computing system, thereby reducing the processing effort necessary. Furthermore, the exponential function can be processed easily by a computing system, thereby reducing the processing power and other computing resources required for calculating the results.

In one embodiment, processing the image as input by the neural network comprises processing, by a first layer of the neural network, the input image to create a first intermediate output and processing, by each following layer the output of the preceding layer, wherein the neural network comprises a plurality of layers, each layer being a depthwise separable convolution comprising, in the processing order of the input within the layer, a depthwise convolutional layer, a first batch normalizer, a first rectified linear unit, a pointwise convolutional layer, a second batch normalizer and a second rectified linear unit, wherein, by processing the input using the plurality of layers, the neural network obtains, as an output, the determination that the image contains either the real object or the spoof.

The depthwise convolutional layer as intended uses a multiplication or inner product of a matrix, either the matrix corresponding to the original image, or the matrix corresponding to the distance map or the matrix corresponding to the reflection pattern, with a kernel being a matrix in the size of, e.g., 3×3 to calculate a further matrix. Using such layers is more efficient with respect to the processing efficiency. In view of this, the depthwise convolutional layers as proposed in the above embodiment are more efficient with respect to their parameter sensitivity than commonly used convolutional layers.

The depthwise convolutional layer and the pointwise convolutional layer may also be referred to as depthwise convolutional sub-layer and pointwise convolutional sub-layer. In fact, they are "layers within a layer" of the neural network, thus constituting sub-layers. By applying this specific realization of the depthwise convolutional layer, together with the pointwise convolutional layer, the batch normalizer and the rectified linear units as provided in the above embodiment, the computer resources that are required by the neural network for performing real-time determination of spoofs within images are significantly reduced compared to the presently known technologies.

In a further embodiment, processing the image by the neural network comprises creating, from the image, at least one matrix I and providing the matrix as input to the neural network, wherein the image comprises N×M pixels and the matrix I is a matrix comprising N×M values, wherein the entries of the matrix I are given by $I_{ij}$, where i and j are integers and i=1 . . . N and j=1 . . . M.

It is noted that the matrix I may be a matrix that corresponds to one of the RGB color values of the original image. However, preferably, the matrix I is obtained from the original image by converting the original image to the HSV color space before creating the matrix I. The HSV color space refers to the Hue-Saturation-Value color space. Converting the originally obtained image to the HSV color space can comprise, in case the original image comprises N×M pixels, that the converted image also comprises N×M pixels or data entries, respectively. Thus, the matrix I may be obtained from the N×M items in the converted image.

It is to be understood that the originally obtained image may have more than N×M pixels. The number of pixels can be reduced to N×M before or after having applied the Hue-Saturation-Value conversion. This conversion is specifically advantageous because the HSV conversion separates the luma information of each pixel from its associated color information (i.e. the RGB values). Thereby, the distance map and the reflection pattern can be calculated more efficiently.

More specifically, each depthwise convolutional layer applies a predefined kernel K to the matrix I, the kernel K being a matrix of size S×T where S,T<N; S,T<M comprising entries $S_{ab}$, wherein applying the kernel to the matrix comprises calculating the inner product of the matrix K with each reduced matrix R of size $(N \times M)_{S,T}$ of a matrix Z, where the matrix R has the same size as the kernel K, and the matrix Z has size $((N+2P_w) \times (M+2P_h))$ and the entries of the matrix $Z_{cd}$ with $c,d \in \mathbb{N}^+$ are given by $$Z_{cd} = \begin{cases} 0 \forall c \leq P_w \\ 0 \forall c > P_w + N \\ 0 \forall d \leq P_h \\ 0 \forall d > P_h + M \\ I_{ij} \text{ where } c = i + P_w; d = j + P_h; i = 1 \ldots N; j = 1 \ldots M \end{cases}$$

and provide a matrix P as output, wherein the matrix P has the size $$\left(\frac{N - S + 2P_w}{W_w} + 1\right) \times \left(\frac{M - T + 2P_h}{W_h} + 1\right),$$

where $W_w$ and $W_h$ define the stride width and each entry $P_{ij}$ of the matrix P is the value of the inner product of the ij-th reduced matrix R with the kernel K, wherein the matrix P is provided as output by the depthwise convolutional layer to the first batch normalizer.

The kernel allows for properly weighing information obtained from adjacent pixels in introduced matrix while not losing any information, thereby increasing the efficiency with which consecutive layers in the neural network can support the processing in order to determine a spoof or real object. For this, the kernel comprises entries that correspond to specific weights or parameters that are obtained prior to receiving the image, i.e. during training of the neural network.

It is a finding of the present disclosure that, in case this training is performed before the mobile device is actually equipped with an application or other program that can perform the respective method according to the above embodiments, the required computer resources can be advantageously reduced on the mobile device.

While it is a finding of the present disclosure that it is most advantageous to implement the separable convolution using a depthwise convolutional layer and a pointwise convolutional layer because this combination shows improved performance with respect to the identification and the required computer resources, it can still be contemplated that the depthwise convolutional layer is replaced with a convolutional layer specifically adapted to the identification of fingers or fingertips. Therefore, even though the description of the present disclosure is focused on the use of depthwise convolutional layers, it is also possible to implement the present disclosure using a convolutional layer.

Moreover, the size S and T of the kernel may be equal for all convolutional layers or is different for at least one convolutional layer and/or at least one of the entries in the kernel K $S_{a'b'} \neq S_{a \neq a', b \neq b'}$.

By choosing an identical kernel for each of the convolutional layers (i.e. for each of the depthwise convolutional layers), the resulting program that is installed on the corresponding mobile device can be reduced in size. On the other hand, if a kernel is used that differs for at least one of the convolutional layers, known issues with respect to identification failures can be avoided if the kernel is properly adapted. For example, using a bigger kernel (corresponding to a bigger size S and T) at the beginning of the identification procedure can allow for taking and focusing more important portions of an image, thereby increasing the identification efficiency.

It is a finding of the present disclosure that a corresponding kernel represents the best trade of between the size of the kernel, the identification efficiency and the computer resources required for implementing the respective method, thereby increasing the overall efficiency with respect to the identification accuracy and the computer resources required.

In a further embodiment, the batch normalizer provides a normalized reduced matrix P' to the rectified linear unit and the rectified linear unit applies a rectification function to each entry $P'_{ij}$ wherein the rectification function calculates a new matrix $\overline{P}$ with entries $$\overline{P}_{ij} = \begin{cases} 0 \forall P'_{ij} < 0 \\ P'_{ij} \forall P'_{ij} \geq 0 \end{cases}$$

and the matrix $\overline{P}$ is provided as output to the pointwise convolutional layer if the rectified linear unit is the first rectified linear unit or to the next layer of the neural network if the rectified linear unit is the second rectified linear unit; and/or the pointwise convolutional layer applies a weight a to the matrix I, P, P' or $\overline{P}$ received from the preceding layer by multiplying each entry in the matrix P, P' or $\overline{P}$ with the weight α.

This rectification function allows for filtering out, after each layer in the neural network, portions in the image that are potentially negatively influencing the determination accuracy of spoofs and real objects.

Even though to each of the points in the matrix P, P' or $\overline{P}$ the same weight a is applied, this embodiment allows for efficiently damping out portions in the image (corresponding to entries in the matrix that will not significantly influence the identification). This damping out is achieved by reducing the absolute contribution of such portions in the matrix and, together with the rectified linear unit, sorting those portions out in the next cycle.

In an embodiment, each step of the methods explained above is performed on the mobile device. This may at least comprise the steps of the above described methods that involve processing of the image and determination of real objects and spoofs. The storing of the image or any subsequently performed step like identifying the user using biometric features or biometric characteristics extracted from the image in case it is determined the object is a real object and not a spoof can still be performed by any storage device and processing being it internal or external to the mobile device. Further, it is still contemplated that a subsequently performed identification step of identifying the user using information obtained from the real object is performed on a device different from the mobile device, like for example a server of a company.

By exclusively performing the respective steps on the mobile device, it is no longer necessary to keep a channel for data transmission, for example, to a server open on which the actually identification process runs. Thereby, the object identification can also be used in areas where access to the mobile network or a local area network is not available.

The mobile device according to embodiments of the disclosure comprises an optical sensor, a processor and a storage unit storing executable instructions that, when executed by the processor of the mobile device, cause the processor to execute the method of any of the above described embodiments.

Figure 1:
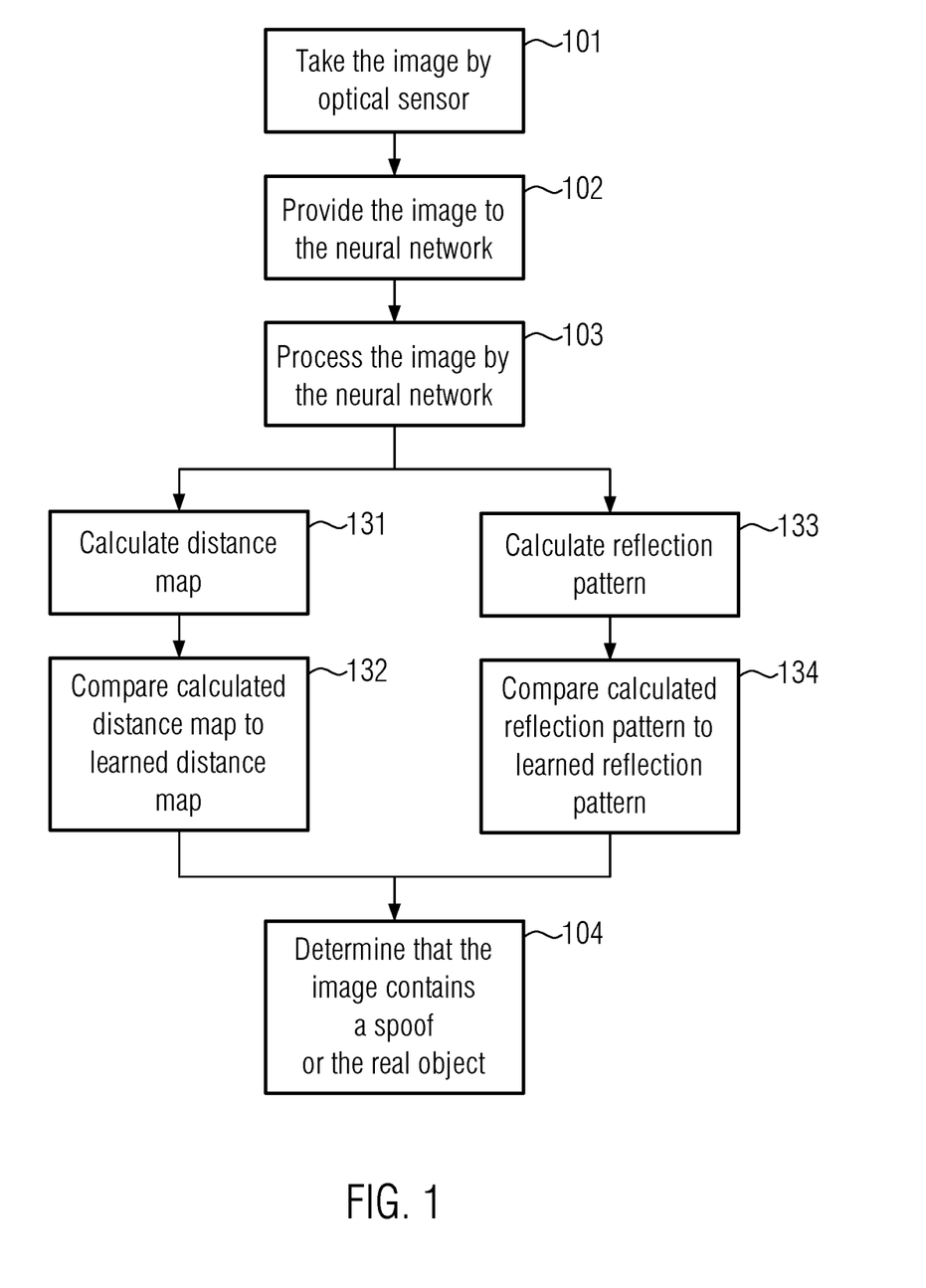
FIG. 1 shows a schematic representation of the processing of an obtained image, according to embodiments of the present disclosure.

FIG. 1 shows a flow diagram of the processing of an obtained image including the taking of the image.

In the first step 101, an image is obtained by an optical sensor of a mobile device like a smart phone or tablet computer. While an image may be taken of an arbitrary situation, for the method according to the present disclosure, it is intended that the image taken comprises an object wherein it is to be determined whether the object within the situation from which the image is taken is either the real object, which will mean that it is a three-dimensional object, or a spoof of the object, which will mean that it is a two-dimensional representation (like a photo) of the real object. In step 101, it is, however, not known to the mobile device nor any other entity whether the image taken shows the spoof or the real object.

The image taken is then provided to a neutral network in step 102. This means that a data structure corresponding to the image, like a plurality of pixels having, for example, color values associated therewith, is provided to a neural network. The neural network can either reside on the mobile device by which the image was taken or it can reside on another computing entity to which the image is forwarded. For example, a user can take the image using his or her smart phone and the information of the image (either completely or in a reduced or otherwise modified manner) is provided to the neural network that resides on a server of a company that provides a tool for, for example, identifying the user with the image of the real object.

The further processing is thus either performed internally on the mobile device or is partially or completely performed outside of the mobile device on another computing entity. The present disclosure is not limited in this regard although it is preferred that the whole method as described in FIG. 1 is performed on the mobile device in order to also allow its application in regions of the world where access to the mobile internet may be limited.

In the next step 303, the image is processed by the neural network. This can mean that either the complete image is processed or a reduced or otherwise manipulated or modified version of the image is processed. For example, if the image is taken in high definition (HD) quality, it may first be reduced to a lesser number of pixels (for example 512×512 or 256×256 or 224×224 pixels) depending on how many pixels are necessary in order to determine an accurate identification of whether the image shows a spoof or the real three-dimensional object. In this regard, step 103 can comprise the "preprocessing" of the image comprising for example the reduction of the number of pixels or any other preprocessing (for example changing the lighting conditions of the image or the like) that is deemed necessary.

However, this step can also be performed between the step 101 of taking the image and step 103 of processing the image by the neural network at any suitable point. For example, the manipulation of the image or the preprocessing of the image can be performed immediately after having taken the image before providing the image to the neural network in step 102 or it can be provided between providing the image to the neural network in step 102 and the actual beginning of the processing of the image by the neural network in step 103 comprising the steps 131 to 134 and the final step 104.

In any case, a data structure corresponding to the original image is now processed in step 103 and the following step 131 to 134.

The processing of the image by the neural network in step 103 can be split in two distinct processings of the image. The first refers to the calculation and processing of a distance map (steps 131 and 132) where the other refers to the calculation and further use of a reflection pattern.

Starting with the distance map. In step 131, a distance map is calculated where the distance map associates each pixel with a calculated distance of the portions of the real world this pixel constitutes or represents within the image of the optical sensor of the mobile device. Assuming, for example, a user holds his hand in front to the optical sensor in order to take an image of the hand, the distance map will comprise calculated distances for at least some pixels that correspond to the distance of the hand to the optical sensor and potentially other distances that are calculated but correspond to different objects within the image, for example a TV that is positioned within the background of the image taken or a house in the landscape constituting the background within the image taken. Therefore, there will be varying distances for pixels constituting or representing different objects within the real world from which the image was taken.

The calculated distance map is, in a next step 132, then compared to a learned distance map of the neural network. The learned distance map can be split, in some embodiments, into at least two distance maps wherein a first learned distance map corresponds to a distance map that refers to images of real objects taken whereas a second learned distance map corresponds to a distance map for an image taken from a two-dimensional spoof of the object. The first will differ from the later in that the first shows varying distances over the whole range of the image whereas the second will have a smooth change of the distance associated with each pixel when moving from a first pixel to the second pixel. This is because in case a two-dimensional spoof (i.e. for example, an image of the real object on paper) is hold in front of the optical sensor when taking the image, the distance of the pixels to the optical sensor can be calculated in accordance with the distance of a given point (the optical sensor) to a plane with arbitrary relative arrangement to the optical sensor (angulation), thus not showing any discontinuities.

The comparison is preferably done completely within the neural network, e.g. as part of the processing of the image within the neural network, although it might also be possible to think of other realizations, where the comparison is done completely outside the neural network or by using additional software or hardware together with the neural network when comparing the obtained and calculated distance maps and reflection patterns, respectively.

From this comparison, a result is obtained that is later used in step 104.

In the other flow, step 133 firstly comprises calculating a reflection pattern representative of light reflection associated with a plurality of pixels constituting at least a portion of the object within the image. The light reflection pattern may, for example, associate a value of brightness with each pixel within the image obtained. This value of brightness likewise corresponds (like for the distance map) to the actual brightness of the real situation from which the image was taken rather than to the brightness of the pixels, as the pixels are only data structures representing the real situation. In order to appropriately calculate the reflection pattern, it can be preferred that the image is taken in step 101 by a camera of the mobile device using the flash of the camera. Thereby, portions of the real situation from which the image is taken that are near to the optical sensor will be comparably bright and reflect a significant amount of incident flash whereas more distant portions within the real situation or portions of objects that are tilted with respect to the optical sensor will reflect less of the flash and will, therefore, look comparably darker. Because of the flash is a light source approximately in the form of a point, the calculation of the reflection pattern when using the flash is much more accurate compared to the reflection pattern that can be obtained when only using the actual ambient light conditions because the ambient light is not a light source in the form of a point.

In the next step 134, like in the step 132, the calculated reflection pattern is compared to a learned reflection pattern of the neural network. Like in step 132, the neural network has preferably two learned reflection patterns where the first learnt reflection pattern corresponds to images of real objects taken whereas the second refers to a reflection pattern of a two-dimensional spoof. This comparison provides a result that is later used in step 104.

Irrespective of whether the processing of the image was done by following steps 131 and 132 or steps 133 and 134 or performing even all of these steps, it is finally determined in step 104 whether the image taken by the optical sensor contains or comprises a two-dimensional spoof of a real object or whether it comprises the real object. This determination is, according to the present disclosure, done based on the outcome of the comparison in either step 132 and/or step 134. Accordingly, the result of those steps preferably is or comprises a number or any other information that can be used to later on determine whether there is shown a spoof or a real object within the image.

As will be explained later, the neural network will comprise a plurality of layers including one last layer. In one embodiment, the last layer according to the present disclosure can comprise a first and a second node where the first node provides an output that ranges from $-\infty$ to $+\infty$ regarding a real objection being determined during the comparison step in step 132 or 134 whereas the second node provides an output ranging from $-\infty$ to $+\infty$ for a spoof being identified during the steps 132 and/or 134.

For example, the output values may represent the sum of the differences constituting the obtained distance map and the learned distance matrix. Assuming the obtained distance map could be represented as a number of distances corresponding to specific pixels ij (i-th row, j-th column of the image) O and the learned distance map is L with each having entries $O_{ij}$ and $L_{ij}$. Then, the result D=L-O would have entries $d_{ij}$. By calculating the sum $\Sigma_{ij} d_{ij}$, an output can be provided as one example of the nodes in the last layer. A first output will correspond, e.g. to the structure L of a learned distance map for a real object and second output by the second node to the structure L of a learned distance map corresponding to a spoof. The same, of course, holds for the reflection pattern.

While the above explanation might give the impression that O, L and D would be structures like commonly known matrices with respective entries, it will usually not be possible to represent the distance maps and reflection patterns (either learned or obtained) in the form of a regular matrix. This is because the distance maps are obtained while the image is processed within the neural network itself, thus not allowing for a simple representation in the form of a matrix. However, for ease of explanation, it might be assumed that O, L and D could be represented in the form of a matrix in order to give this procedure a context that can more easily be visualized.

With such values (like the sum $\Sigma_{ij} d_{ij}$), it is not easily possible to determine whether the output of the first node or the second node constitutes a real object or a spoof of the real object. Therefore, according to this embodiment some normalizations are performed in order to allow for a determination of whether or not there is shown the real object on the image or a spoof of the object.

In order to achieve this, the output values of the first node and the second node denoted with $x_i$, where i=1 for the first node and i=2 for the second node are first reduced to a value $S(x_i)$ where $$S(x) = \frac{e^x}{1+e^x}$$

While these values are smaller than 1 already, they do not necessarily sum up to 1, thereby not necessarily allowing for making statistical or probabilistical decisions.

In order to allow for such a decision, it is assumed that the probability of finding a spoof of an object or a real object within the image obtained sums up to 1 because either the spoof or the real object must be on the image. In view of this assumption, the calculated values $S(x_i)$ are now further processed in order to obtain values $\sigma(S(x_i))$ with the following normalization function:

$$\sigma(S(x_j)) = \frac{e^{S(x_j)}}{\Sigma_i e^{S(x_i)}}$$

The values $\sigma(S(x_j))$ will sum up to 1 in any case because the function above constitutes the calculation of a norm of a vector and is known as the soft max function.

With the values $\sigma(S(x_1)) \equiv \sigma_1$ and $\sigma(S(x_2)) \equiv \sigma_2$, statistical and probabilistical statements are possible.

Therefore, the results of this calculation $\sigma_1$ and $\sigma_2$ can be used for the determining step 104 of FIG. 1. If $\sigma_1$ which constitutes the probability that the image shows a real object is greater than 0.5 (corresponding to $\sigma_2$<0.5) the determination will result in the statements that the image shows a real object whereas, if $\sigma_2$>0.5 (corresponding to corresponding to $\sigma_1$<0.5) the determination will be that the image shows a spoof of the real object.

Though not explicitly shown in FIG. 1, further steps can follow the determination step 104. For example, the determination of whether a real object or a spoof of a real object is shown on the image can be used to, for example, trigger further steps like an indication to the user or another entity that the image taken shows a spoof of a real object and can, for example, thus not be used for identifying the user in a log in procedure or other security relevant process like performing a bank transfer. On the other hand, if the determination is in the affirmative, i.e. the image shows the real object, a further process can be triggered that identifies the user based on user specific information that can be obtained from the real object. This can, for example, comprise processing the image of the real object further. If, for example, the real object is a hand or a fingertip, biometric characteristics like the finger print can be obtained from the image and can be used in identifying the user and, for example, performing a log in procedure or other process where this biometric characteristic is used.

Figure 2:
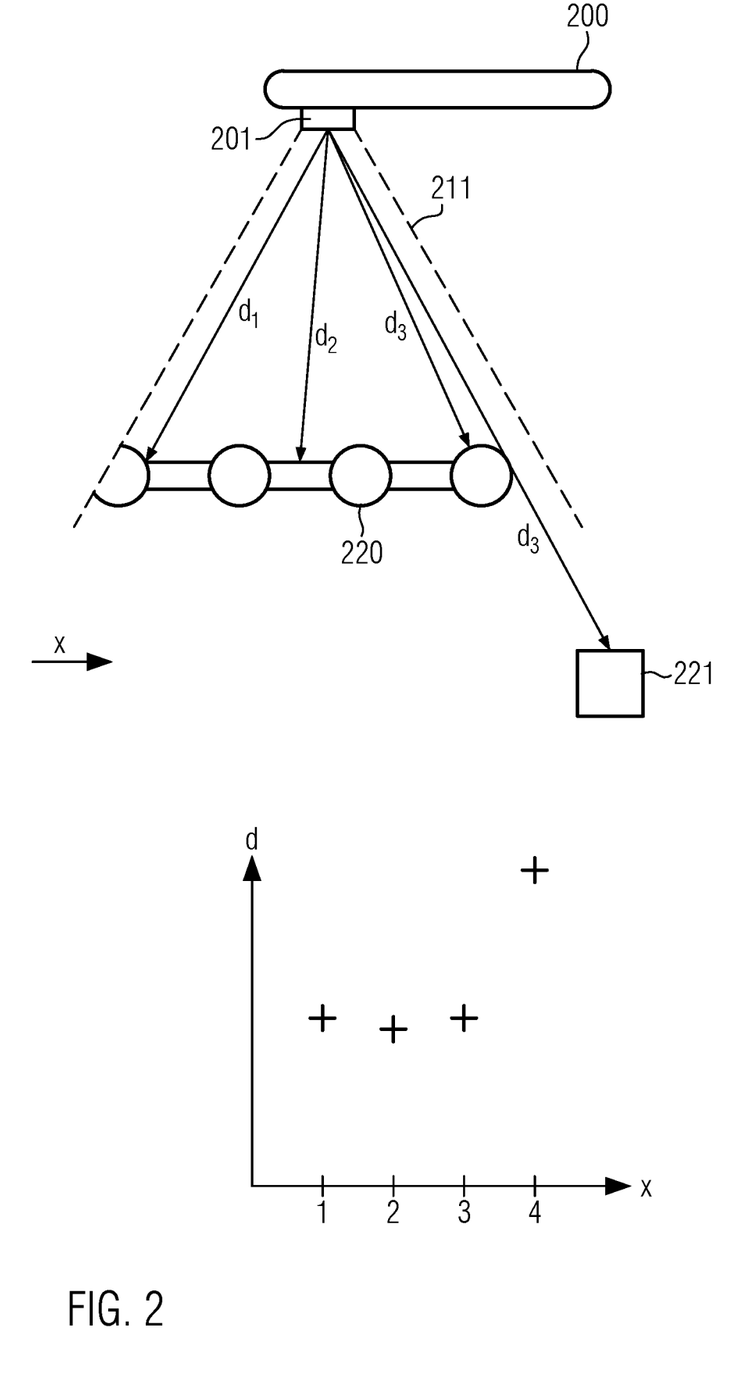
FIG. 2 shows a schematic depiction of the relation between pixels within an image and the distance of the real object to the optical sensor, according to embodiments of the present disclosure.
Figure 3:
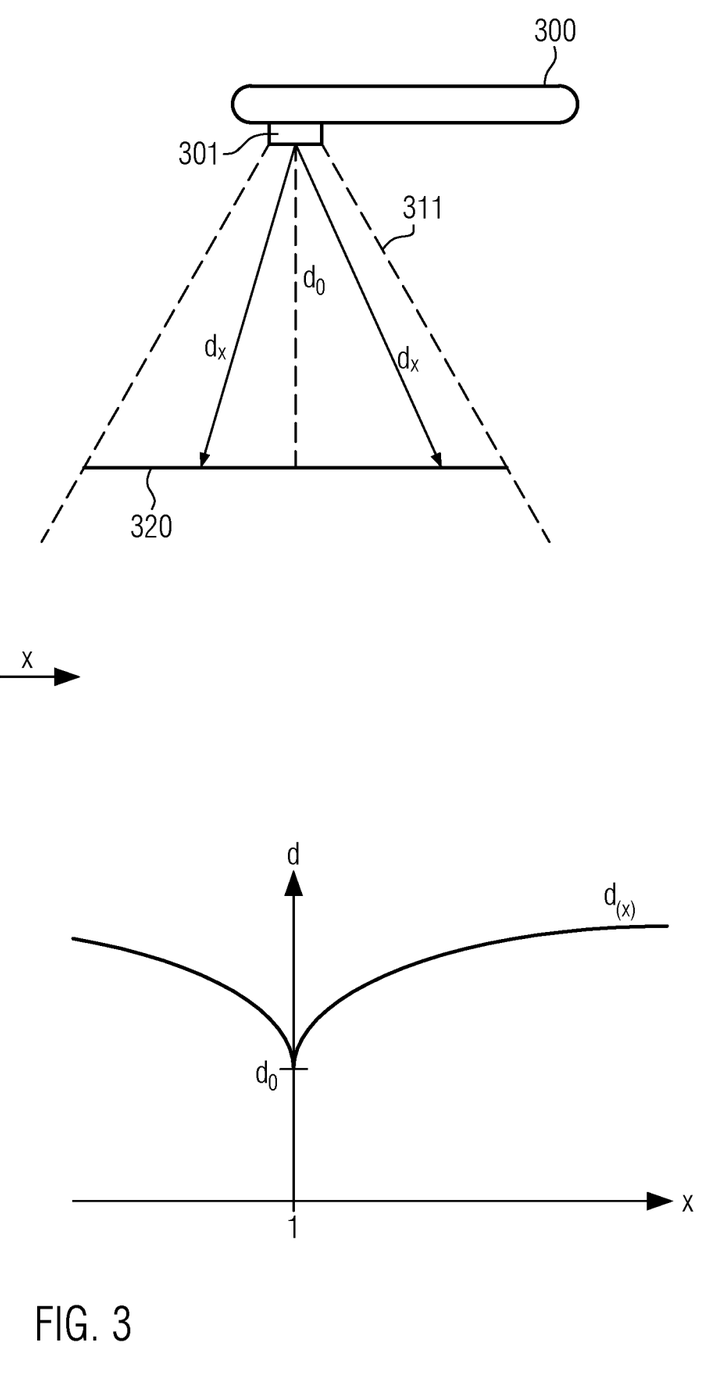
FIG. 3 shows a schematic depiction of how a light reflection pattern is determined, according to embodiments of the present disclosure.

FIGS. 2 and 3 show a schematic depiction of how the distance map will exemplarily look like for an image being taken from a real object and an image being taken from a spoof of the real object. As explained above, the distance maps and the reflection patterns can usually not be represented in the form of a matrix. However, for explaining the concept of obtaining the distance maps and reflection patterns, it will be assumed that it would be possible to have a 1 to 1 mapping between pixels and their associated distances/reflection properties. For explanatory purposes, this might be considered to, somehow, refer to a representation of the distance map and reflection patterns in the form of a matrix.

In this regard, FIG. 2 shows the situation where the image is taken from a real object using a mobile device 200 with an optical sensor 201 having a field of view 211 under which the image is taken. The depiction in FIG. 2 is a two-dimensional cross section of the real three-dimensional situation that would be viewed by the optical sensor in the real world. The real object from which the image is intended to be taken is the object 120 whereas, occasionally, additional objects may be present in the field of view 211 of the optical sensor, like the object 221. The image obtained from the shown two-dimensional arrangement will be a one-dimensional arrangement of pixels (corresponding to the image taken from the real three-dimensional situation being a two-dimensional image), where those pixels are arranged in the indicated direction x. For each pixel in the image, for example, the pixels with the indication 1, 2, 3 and 4, a distance will be calculated. For a real situation, this will result in the distance map also given in FIG. 2. As can be seen, the distance of real objects varies in an arbitrary manner and cannot be easily calculated using a function only depending on a limited amount of parameters because the arrangement of the real objects with respect to the optical sensor and the three-dimensional structure (in the depiction of FIG. 2a, the two-dimensional structure) of the object is usually unknown.

In contrast to this, FIG. 3 shows the case where an image of the real object (i.e. a two-dimensional spoof) is hold in front of the optical sensor. In the shown example, it is once again assumed that the situation obtained by the optical sensor is represented by a two-dimensional situation and the "image" obtained is, thus, one-dimensional as already explained with respect to the case in FIG. 2.

For simplicity of explanation, it is further assumed that the image is hold with respect to the optical sensor 301 such that it is in parallel to the mobile device 300 to which the optical sensor is attached. Furthermore, again for ease of explanation, it is assumed that the (two-dimensional) image of the spoof 330 is provided as perfect plane in front of the optical sensor.

In this case, there exists a point within the field of view 311 of the optical sensor 301 that has the shortest distance $d_0$ from the optical sensor. Any other point within this image will have a distance $d_x$ where this distance is given by $d_x = \sqrt{x^2 + d_0^2}$ such that the shown graphical representation of the distance map according to FIG. 3 can be obtained when assuming that the origin of the coordinate system with respect to the x direction is the point with the smallest distance $d_0$ to the optical sensor.

As can be seen in FIG. 3, this distance map corresponding to pixels of the (one-dimensional) image obtained only depends on the distance of a given point in the image from the origin and the minimum distance $d_0$ and can thus be calculated using the above formula.

Therefore, it is clear that a distance map of a real object or a real situation obtained by the optical sensor will significantly differ from a distance map of a two-dimensional spoof because the distance map of the two-dimensional spoof can be obtained by calculating the value of a function that has a limited number of parameters.

The same is true for the calculated reflection pattern, though this cannot be easily imaged in the manner as was done with respect to the distance map.

However, from the above explanations with respect to the distance map calculated, it also becomes clear that, for each pixel in the image taken, it is possible to calculate a reflection value or a brightness value or any other value that is associated with lighting conditions corresponding to the real situation. In case the real situation is again a two-dimensional spoof of the real object as explained in FIG. 3, the reflection pattern (more easily explained with respect to the light intensity) will also vary in line with the above formula or at least depending on the above formula because the intensity of light obtained from a given point in first order approximation is reciprocally dependent on the square of the distance.

For a situation showing a real object among a plurality of other objects (like in FIG. 2), the reflection pattern will thus be a very complicated structure whereas, for the case that a two-dimensional spoof is shown to the optical sensor, the reflection pattern can be easily calculated using a function with a limited number of parameters.

The same will be the case for the learned distance maps (or reflection pattern) corresponding to real objects and the learned distance maps corresponding to two-dimensional spoofs of objects as are known to the neural network. Therefore, the neural network can make a reasoned determination on whether the image obtained shows a real object or a spoof of this object by comparing the learned distance maps (and, of course, reflection patterns) with the obtained distance maps and reflection patterns.

In order to simplify the calculation of the distance map and the reflection pattern, respectively, and in order to reduce the computer resources required for the determining step 104, the learned distance map and learned reflection pattern will usually be provided in the neural network in the form of a data structure where each entry constitutes the learned behavior of the distance or the corresponding reflection pattern.

Likewise, the obtained or calculated distance map and the obtained reflection pattern can be provided in the form of a data structure where each entry constitutes the distance (or the reflection pattern, respectively) in the obtained image.

For both, the learned and the calculated distance maps and reflection patterns, this might even be the case on a pixel per pixel basis, i.e. each entry in the respective data structures corresponds to a learned/calculated distance or reflection pattern of a specific pixel.

This, of course, requires that there is an association between the position of pixels within the obtained image and entries within the data structure. This is achieved by using the arrangement of pixels themselves within the image as the basis for calculating the data structure. This means that the data structure used for the distance map (named for example L) and the reflection pattern (named for example Y), respectively, is built up in line with the obtained image. If, for example, the image comprises 512×512 pixels per color value (i.e. 512×512×3), the distance map and the reflection pattern will be data structure of size 512×512 entries (not necessarily representable as a matrix with 512×512 entries) where each entry corresponds to one pixel in the obtained image (for one color value). The same holds for any other resolution of images.

Figure 4:
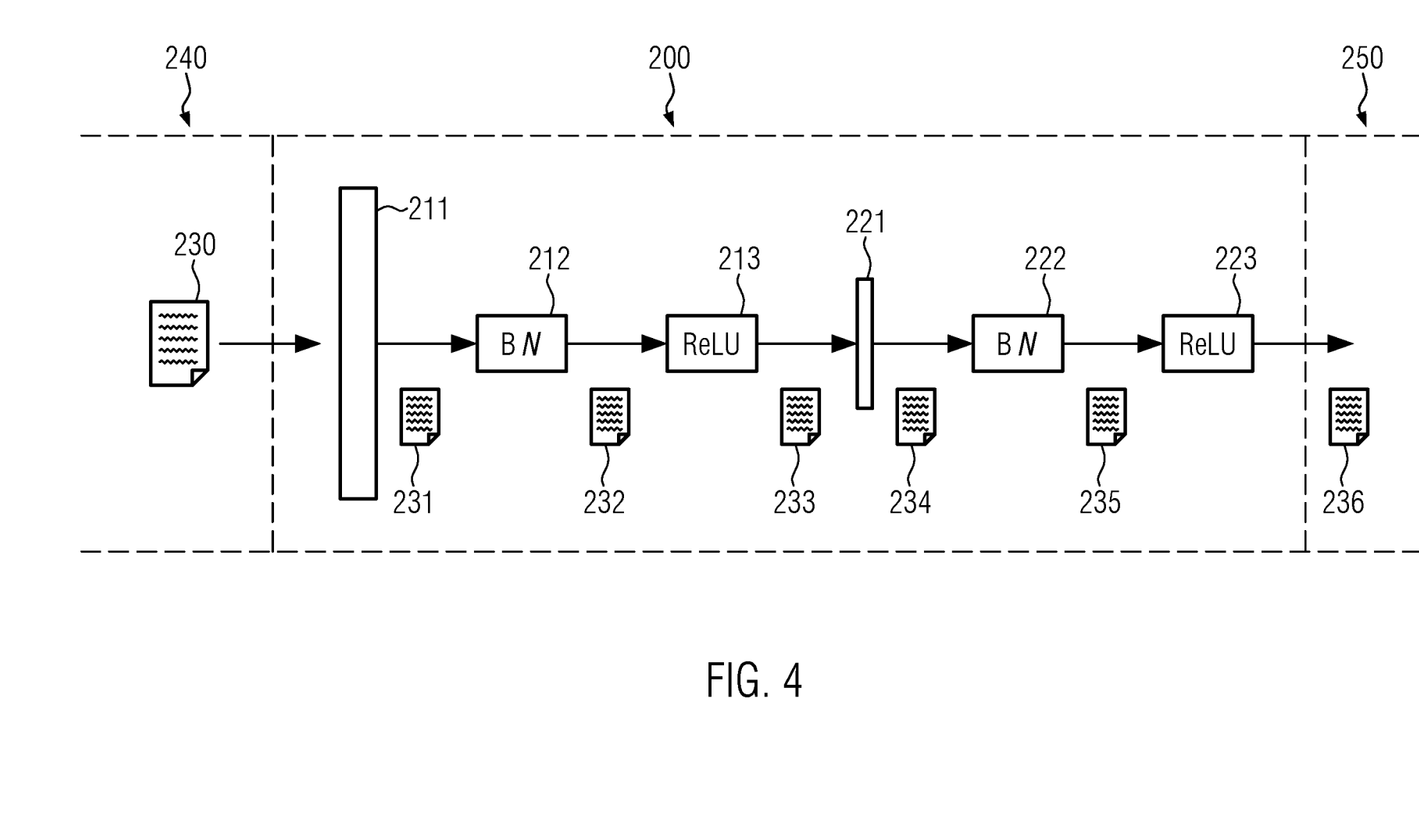
FIG. 4 schematically shows the structure of one layer within a neural network according to one embodiment and the processing of data within this layer, according to embodiments of the present disclosure.

FIG. 4 shows the internal processing of a received input image in one layer 200 of the neural network according to one embodiment of the present disclosure. The input image may either be the original image or an HSV converted data structure obtained from the original image. In fact, the data structure provided to the neural network more likely is a matrix corresponding to the input image after conversion into the HSV color space, as this more appropriately shows the luma values of the pixels, rather than the color values. This can result in more efficient calculation of the distance map and reflection pattern.

This layer 200 may be a layer that is, in processing order of the original input image through the neural network, the first layer that receives the original input image after step 102 explained above or any intermediate layer that is arranged between two further layers 240 and 250 of the neural network or the layer 200 may even be the last layer of the neural network that will, in the end, provide an output according to step 104 as explained with reference to FIG. 1. In the last case, the layer will have two output nodes as explained above to provide a corresponding output for spoof identification and identification of a real object within the image.

In any case, the layer 200 will receive an input 230 that at least somehow corresponds to the originally obtained image. This input is preferably provided in the form of at least one matrix that has the dimension N×M where N and M are integers greater than 0. The matrix may, for example, represent the pixels in the image for at least one color value (for example red) or the HSV converted image. The entries in this matrix thus may have values that correspond to the value of the respective color (in the example case red) of this specific pixel or its luma value. As will be clear from the following, the input may not be identical to the obtained image but can be a matrix P that was obtained from the matrix representing the original image by some processing through layers in the neural network or even by some pre-processing (for example reduction in resolution as explained above).

For ease of discussion, however, the input 230 will be assumed to correspond to the N×M matrix that represents the originally obtained image and each entry in this N×M matrix corresponds to a value of a color (for example red) of a pixel in the respective image. Applying this teaching to any other transformed matrix that originates from the original N×M matrix and is obtained through processing this matrix in layers of the neural network is straightforward.

Following now the process exemplified in FIG. 4, the input 230 is received by the depthwise convolutional layer 211 for processing. In the following, a comparably simple example will be given with respect to how the input matrix 230 can be processed by the depthwise convolutional layer. This will involve that a kernel K is used to calculate inner products with the matrix. The kernel is run over the matrix in so called "strides". While the following example will use values for horizontal and vertical stride widths of 1, any other value greater than 1 can be used as long as the stride widths are integers greater than 0. The kernel K is of size S×T, where S and T are integers and smaller than N and M.

Furthermore, it will be assumed that only the original input matrix I (i.e. the input matrix 230) of size N×M is used for calculating the inner product with the kernel. It is, however, also contemplated that an extended matrix Z can be used for calculating the inner products with the kernel. This extended matrix Z is obtained by "attaching", to the original matrix I, lines and rows above the first line and below the last line as well as left to the first row and right to the last row.

This is called "padding". The padding will usually comprise that a number $P_w$ of lines is added in the line direction and a number $P_h$ of rows is added to the row direction. The number $P_w$ can equal S−1 and the number $P_h$ can equal T−1, such that any inner product calculated between Z and the kernel contains at least one entry of the original matrix I. The resulting matrix Z will thus be of size $(N+2P_w) \times (M+2P_h)$. In view of this, the matrix Z will have the following entries:

$$Z_{cd} = \begin{cases} 0 \; \forall \; c \leq P_w \\ 0 \; \forall \; c > P_w + N \\ 0 \; \forall \; d \leq P_h \\ 0 \; \forall \; d > P_h + M \\ I_{ij} \text{ where } c = i + P_w; d = j + P_h; i = 1 \ldots N; j = 1 \ldots M \end{cases}$$

In this context, it follows that the new matrix obtained by calculating all inner products and arranging them properly according to lines and rows will generally be of size $$\left(\frac{N - S + 2P_w}{W_w} + 1\right) \times \left(\frac{M - T + 2P_h}{W_h} + 1\right),$$

where $W_w$ and $W_h$ define the stride width in the direction of lines and the direction of the rows, respectively. It is clear that only those paddings and those stride widths are allowed for a given kernel K with size S×T that result in integers for the size of the new matrix. Furthermore, the stride widths $W_w$ and $W_h$ are preferably smaller than S and T, respectively, as otherwise the kernel would be moved over the matrix I in a manner that some lines or rows of the original matrix are left out in calculating the new matrix.

For ease of discussion, it will be assumed in the following that no padding is provided to the original matrix I and the stride width is 1 for horizontal and vertical strides. Furthermore, it will be assumed that the kernel is a matrix with size S×S, i.e. the special case where S=T will be assumed. Applying the explanations given below to arbitrary padding and stride width as well as to any kernel size is straightforward with the teaching provided below.

In the depthwise convolutional layer 211, the received input matrix 230 is used to form an inner product with the kernel K that has the size S×S where S<N,M. The inner product is calculated for each reduced matrix of the original N×M matrix where the reduced matrix is of size S×S and contains coherent entries in the original N×M matrix. For example, considering S=3, the first reduced matrix R of the N×M original matrix comprises the entries i=1, 2, 3; j=1, 2, 3 such that the reduced matrix (N×M)$_S$ is comprised of nine entries and the inner product with the kernel K is calculated which results in a single number. The next reduced matrix in the directions of the lines of the original N×M matrix is the matrix where i is increased by 1, such that the next matrix in this direction is constituted of the items in the original N×M matrix where i=2, 3, 4; j=1, 2, 3. This matrix may then be used for calculating the next inner product with the kernel. It is noted that the given example of the S×S matrix with S=3 is only one example and other kernels may also be used.

In order to calculate the next reduced matrix R of the size (N×M)$_S$ in the direction of the rows/columns, the index j of items in the original N×M matrix is increased by 1. This is done until the last reduced matrix in the direction of the lines where i=N−S+1, N−S+2, N−S+3 in the case for S=3. For the rows, this is done in a corresponding manner where j=M−S+1, M−S+2, M−S+3. By calculating those inner products, a new matrix, the matrix P is calculated that has the size (N−S+1)×(M−S+1). Its entries P$_{ij}$ correspond to the respective inner product calculated with the corresponding reduced matrix of the original N×M matrix and the kernel K. It is noted that a matrix of this size will, in fact, be forwarded to the pointwise convolutional layer of the layer 200.

The kernel K constitutes entries that are obtained through a learning process where the neural network is trained in order to properly identify the intended objects, i.e. distinguish between spoofs of objects and the real objects. The kernel K used in the layer 200 of the neural network is not necessarily identical in size and entries to the kernels used in other layers of the respective neural network. Additionally, the entries in the kernel do not need to be identical to each other but at least constitute numbers being larger or equal to 0. The entries may be considered to represent "weights" that are obtained through learning of the neural network.

The result of the processing of the matrix 230 by the depthwise convolutional layer is the matrix 231 having, as explained above, size (N−S+1)×(M−S+1) in case the kernel is moved in strides over the original N×M matrix that have a distance of Δi=1 in the direction of the lines Δj=1 in the direction of the rows. In case, however, those strides have a larger distance like Δi=2 or Δi=3 (and potentially, correspondingly for the rows), the dimension of the result 231 will change correspondingly as explained above.

In the further processing, this result 231 is forwarded to the first batch normalize 212 that follows in the processing order depicted with the arrows in FIG. 4 after the depthwise convolutional layer 211. The batch normalizer attempts to normalize the received result matrix 231. This is achieved by calculating the sum over each of the entries in the (N−S+1)×(M−S+1) matrix and dividing it by the number of entries in the (N−S+1)×(M−S+1) matrix. The mean value V for the (N−S+1)×(M−S+1) (denoted as P in the following, with corresponding items P$_{ij}$ matrix is given as $$V = \frac{\Sigma_{ij} P_{ij}}{n \cdot m}$$

where n and m represent the number of lines and columns/rows in the N×M matrix or the number of lines and columns in the matrix P. The items P$_{ij}$ are the entries of the matrix P where a given item P$_{ij}$ is the element in the matrix in line i and column j.

The batch normalizer then calculates a reduced matrix P' by subtracting, from each entry P$_{ij}$ in the original matrix, the mean value V such that P'$_{ij}$=P$_{ij}$−V. Thereby, the values in the reduced matrix P' are normalized such that anomalies in the one or the other direction (extremely large values or extremely low values) are filtered out. It is also contemplated that the item P'$_{ij}$ is calculated by dividing the term P$_{ij}$−V by the standard deviation corresponding to the mean value V.

The result 232 created by the first batch normalizer 212 is a matrix still having (in the example given in FIG. 4) the size (N−S+1)×(M−S+1) since, until now, no further dimensional reduction of the matrix was performed.

The result 232 is then provided to the first rectified linear unit 213 that follows the first batch normalizer 212.

The rectified linear unit modifies each entry in the matrix 232 further by calculating new matrix entries $\overline{P}_{ij}$ where $$\overline{P}_{ij} = \begin{cases} 0 \ \forall \ P'_{ij} < 0 \\ P'_{ij} \ \forall \ P'_{ij} \geq 0 \end{cases}$$

This results in values that would be smaller than 0 after having passed the batch normalizer to be set to 0, thus having no further influence on the further processing in the depthwise convolutional layer that will be explained in the following. This means that, for example, color values that are below the mean value calculated in the batch normalizer are not considered further and only the values that at least correspond to the mean value V have influence on the outcome of the next step in the calculation.

The result 233 thus output by the first rectified linear unit 213 still is a matrix of shape/size (N−S+1)×(M−S+1) and this matrix is forwarded to the pointwise convolutional layer 221.

This pointwise convolutional layer 221 creates a result 234. This result 234 is created by the pointwise convolutional layer 221 by taking each entry in the (N−S+1)×(M−S+1) matrix 233 and multiplying this entry with a weight α. α preferably is a number that is greater than 0 in any case and this number is identical for each entry in the (N−S+1)×(M−S+1) matrix. The result 234 that is obtained from the pointwise convolutional layer 221 thus is a matrix having the same size (N−S+1)×(M−S+1) but where each entry is multiplied with the weight α.

The result 234 is then provided to the second batch normalizer 222 where it is normalized in the manner as explained for the first batch normalizer 212 and a normalized matrix P' of the same dimension as the result 235 is calculated and this matrix/result 235 is forwarded to the second rectified linear unit 223 where a rectification function is applied to obtain a result/matrix $\overline{P}$ 236 that is then forwarded to the next layer in the neural network or, if no other layer follows in the neural network, the result 236 is provided as an output.

Figure 5:
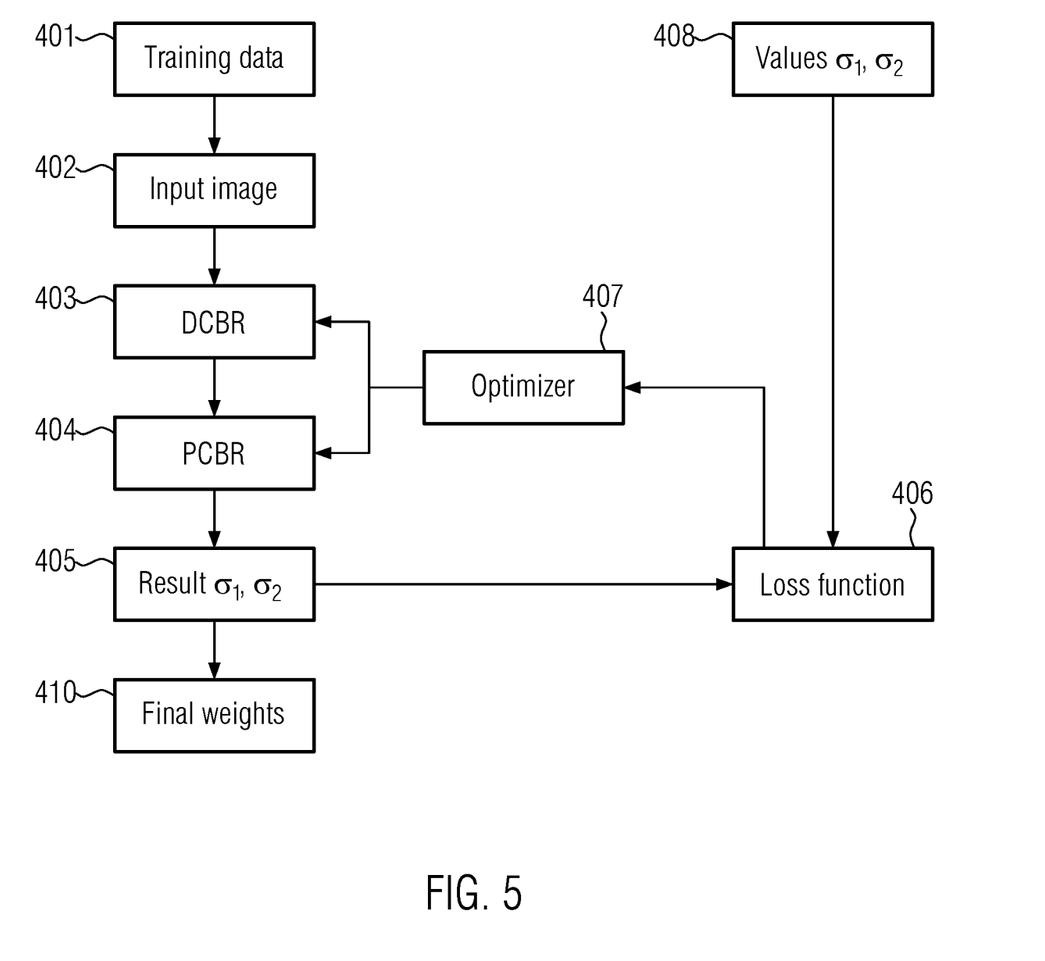
FIG. 5 shows the process of training a neural network, according to embodiments of the present disclosure.

In FIG. 5, an explanation will now be given how the neural network can be properly trained such that the weights of the kernel K and the weight α explained with respect to FIG. 4 as well as the patterns that indeed identify a real object or a spoof of the real object are learned by the neural network.

The method of FIG. 5 begins with the provision of training data 401. The training data may be constituted by a plurality of images of real objects as well as images of spoofs of real objects. For example, the images may comprise a number of images of real hands or fingers or the like and images of images (i.e. spoofs) of those objects. The images may be multiplied by using, from the same image, rotated, highlighted, darkened, enlarged or otherwise modified copies that are introduced as training data. Preferably, modifications involving image flips, image rotation and translation, shears, crops, multiplication to increase brightness and Gaussian blurs may be used to obtain a larger number of training images. Arbitrary combinations of the mentioned techniques may also be used. The values $\sigma_1$ and $\sigma_2$ provided according to item 408 are the values indicating the "correct" output of the first node and second node of the last layer in the neural network that provide the probability of the image showing a spoof of an object or a real object. These values are provided for each image in the training data.

In the next step, one specific input image 402 is provided to the neural network in a training environment where, in addition to the neural network, an optimizer 407 and a loss function calculator 406 are provided.

The input image is, in a first round, processed using the depthwise convolutional layer and the first batch normalizer as well as the first rectified linear unit 403, summarized as DCBR, and is then transferred to the pointwise convolutional layer, the second batch normalizer and the second rectified linear unit, summarized as PCBR, where they are processed in line with the description given in FIG. 4. This means the steps or the sections 403 and 404 depicted in FIG. 5 are run through preferably a number of times, like thirteen times, as described with reference to FIG. 4 using, in each section 403 and 404 the corresponding weights for the pointwise convolutional layer (PC) and the kernel K of the depthwise convolutional layer (DC). The first and second batch normalizers as well as the rectified linear units of items 403 and 404 work in the manner as explained above with respect to FIG. 4.

As a result, in line with the above description, values $\sigma_1$ and $\sigma_2$ are obtained. This result will then be provided to the loss function where it will be compared with the preset values $\sigma_1$ and $\sigma_2$ provided in 408 in order to identify the differences between the result 405 and the correct values $\sigma_1$ and $\sigma_2$. This difference obtained by the loss function 406 is then provided to the optimizer 407 which, in turn, will modify the weights of each pointwise convolutional layer and each depthwise convolutional layer, i.e. α and the entries in the kernel K. This means that, either for all layers in the network at once or for each layer in isolation, the weight α of the pointwise convolutional layer and the entries in the kernel K of the depthwise convolutional layer are manipulated.

With those new values, the cycle is repeated for the very same image and the resulting values $\sigma_1$ and $\sigma_2$ are provided to the loss function and compared to the correct values $\sigma_1$ and $\sigma_2$, the result of which being then provided to the optimizer 407 which, once again, modifies the weights.

This procedure is performed as long as the difference between the resulting values $\sigma_1^{(n)}$ and $\sigma_2^{(n)}$ (where n constitutes the n-th iteration of these values) to the values $\sigma_1$ and $\sigma_2$ of item 408 exceed a given threshold which, in essence, corresponds to the determination accuracy of spoofs and real objects that is intended.

After that, the next input image 402 is taken from the training data 401 and the corresponding values $\sigma_1$ and $\sigma_2$ are provided to the loss function. Then, the process explained is repeated again for the new image and the optimal weights for the pointwise convolutional layer and the depthwise convolutional layer are obtained. This is repeated until a specific combination of weights results in appropriate identification accuracy for all input images. The combination of weights that is then obtained is output as final weights 410.

These final weights are then introduced into the application that executes the inventive method on the mobile device. In fact, by this method, it is possible for the neural network to learn specific distance maps and reflection patterns that show a real object or a spoof of the real object. The method described in FIG. 5 can thus be performed with input that is used for learning distance maps or reflections patterns alike.

It is also possible to provide, in addition to the values $\sigma_1$ and $\sigma_2$ or in combination, the correct distance maps and reflection patterns corresponding to the images. In this case, the output of the neural network in step 405 will not only be the respective values $\sigma_1^{(n)}$ and $\sigma_2^{(n)}$ but also a distance map and/or a reflection pattern to compare with the preset distance map and/or reflection pattern obtained via the input 408.

Therefore, in the concept of the present disclosure, the neural network that is provided to the mobile device is already fully adapted to the determination whether an image shows a real object or only a two-dimensional spoof of the real object.

In total, by using the pointwise convolutional layers, the depthwise convolutional layers and the batch normalizers as well as the rectified linear units as explained above with reference to FIG. 4, an application can be provided that is smaller than one megabyte, thus allowing for utilization on a mobile device in isolation even without any access to additional data sources via the internet or the like. This makes it suitable for application in environments where no access to wireless networks or the like is possible. Additionally, the processor power required for running this application is reduced to a minimum while still yielding appropriate determinations of real objects that can be used for later on performed identification of the user by, for example, extracting biometric characteristics from an identified real object in order to use this biometric characteristics for further security-related processes.

Figure 6:
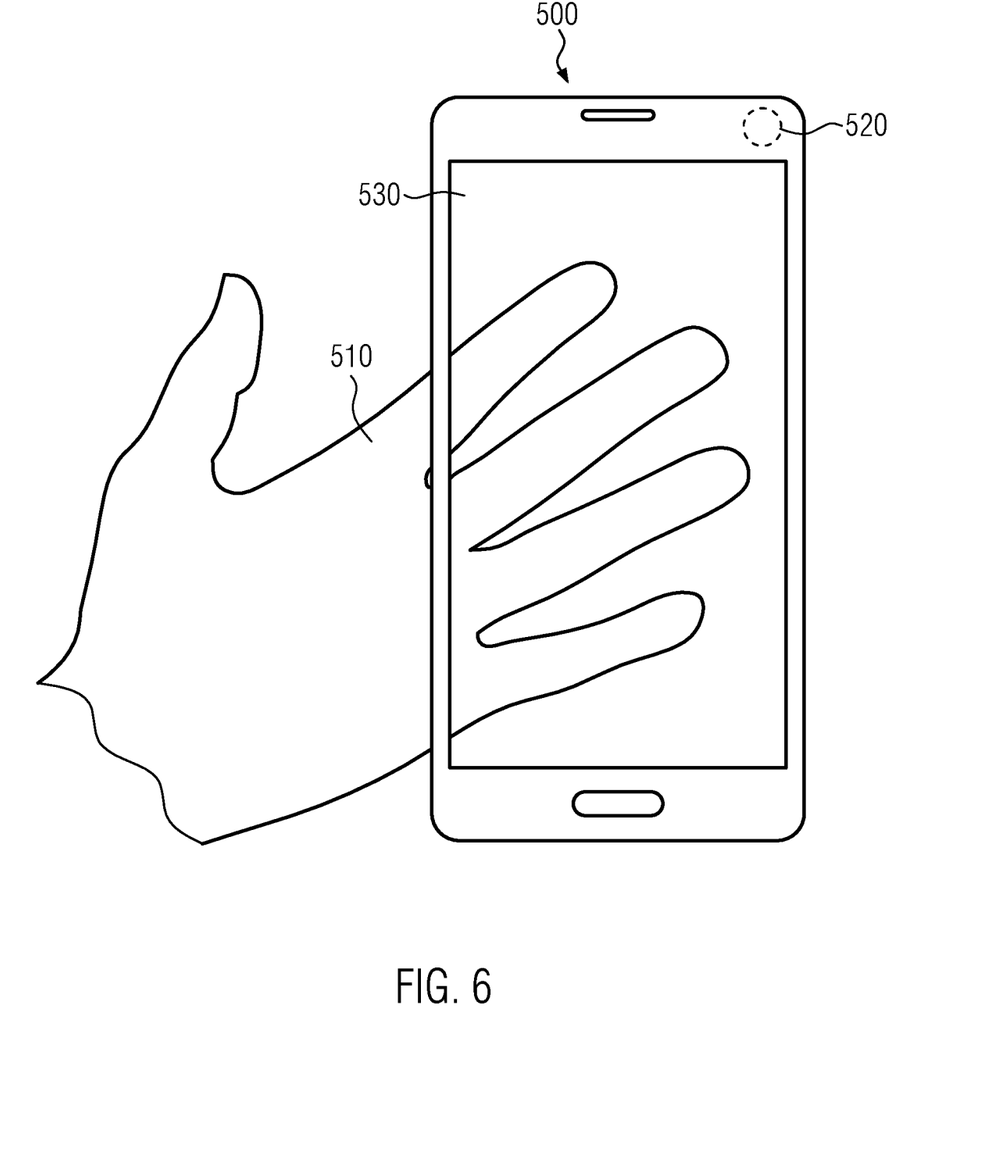
FIG. 6 shows a mobile device for obtaining an image and identifying an object within that image according to one embodiment.

In order to give a context where the inventive method can be carried out, FIG. 6 depicts a mobile device in the form of a smartphone according to one embodiment of the present disclosure.

The mobile device 500 is embodied as a smartphone as is presently known. It comprises an optical sensor 520 preferably on the backside of the camera which is opposite to the side of the mobile device 500 on which the display 530 is provided. The camera can be a camera having a resolution of 1MP, 2MP or even more, thus, for example an HD camera. It can be provided with a flashlight but does not need to. It can also be adapted to take real-time images with a reduced resolution and once the camera is activated, the display 530 may show a representation of what the camera actually "sees". This can be, for example, a hand 510.

What is claimed is:

1. A method for distinguishing a real three-dimensional object from a two-dimensional spoof of the real three-dimensional object, the method comprising:
   obtaining, by an optical sensor of a mobile device, an image, wherein the image contains an object that is either the two-dimensional spoof or the real three-dimensional object;
   providing the image to a neural network;
   processing the image by the neural network by
      calculating at least one of: 1) a distance map representative of a distance of a plurality of pixels to the optical sensor, the pixels constituting at least a first portion of the object within the image; or 2) a reflection pattern representative of light reflection associated with a plurality of pixels constituting at least a second portion of the object within the image; and
      comparing at least one of the distance map or the reflection pattern with a learned distance map or a learned reflection pattern to determine, based on an outcome of the comparison, that the object in the image is either the two-dimensional spoof or the real three-dimensional object;
   wherein the neural network comprises a plurality of layers and a last layer of the plurality of layers comprises two nodes, further comprising:
      providing, by a first node, a first output regarding a real object being determined during the processing; and
      providing, by a second node, a second output regarding a spoof being determined during the processing; and
   wherein each node provides an output upon processing of the image, wherein the output ranges from $-\infty$ to $+\infty$, and wherein the output of each node is passed to an output normalizer, wherein the output normalizer takes the output $x_i$ of each node and calculates a reduced value $S(x_i)$ by $$S(x) = \frac{e^x}{1 + e^x}$$

where i=1 for the first node and i=2 for the second node, and provides the values $S(x_i)$ to a normalization function $$\sigma(S(x_j)) = \frac{e^{S(x_j)}}{\Sigma_i e^{S(x_i)}}$$

to obtain normalized values $\sigma(S(x_1)) \equiv \sigma_1$ and $\sigma(S(x_2)) \equiv \sigma_2$.

2. The method according to claim 1, wherein the distance map and the reflection pattern are calculated and compared to the learned distance map and the learned reflection pattern, to determine, based on the outcome of the comparison, that the image contains either the two-dimensional spoof or the real three-dimensional object.

3. The method of claim 1, wherein obtaining, by the optical sensor of the mobile device, the image comprises:
   obtaining the image using a flash associated with the optical sensor, wherein the optical sensor is a camera.

4. The method of claim 1, further comprising:
   responsive to determining that $\sigma_1 > 0.5$, determining that the image contains the real three-dimensional object, and
   responsive to determining that $\sigma_2 > 0.5$, determining that the image contains the two-dimensional spoof.

5. The method of claim 1, wherein processing the image by the neural network comprises:
   processing, by a first layer of the neural network, the image to create a first intermediate output;
   processing, by each following layer, the first immediate output of a preceding layer, wherein the neural network comprises the plurality of layers, wherein each layer is a depthwise separable convolution comprising, in the processing order of the input within the layer, a depthwise convolutional layer, a first batch normalizer, a first rectified linear unit, a pointwise convolutional layer, a second batch normalizer and a second rectified linear unit; and
   obtaining as the output, by processing the image using the plurality of layers, the determination that the image contains either the real three-dimensional object or the two-dimensional spoof.

6. The method of claim 5, wherein processing the image by the neural network comprises:
   creating, from the image, at least one matrix I; and
   providing the at least one matrix I as input to the neural network, wherein the image comprises pixels and the matrix I is a matrix comprising N×M values, wherein entries of the matrix I are given by $I_{ij}$, where i and j are integers and i=1 . . . N and j=1 . . . M.

7. The method of claim 6, wherein each depthwise convolutional layer applies a predefined kernel to the matrix I, wherein the predefined kernel is a matrix K of size S×T where S,T<N; S,T<M comprising entries $S_{ab}$, wherein applying the predefined kernel to the matrix I comprises calculating an inner product of the matrix K with each reduced matrix R of size $(N \times M)_{S,T}$ of a matrix Z, where the matrix R has the same size as the predefined kernel, and the matrix Z has size $((N+2P_w) \times (M+2P_h))$ and entries of matrix $Z_{cd}$ with c,d $\in \mathbb{N}^+$ c, are given by $$Z_{cd} = \begin{cases} 0 \forall c \leq P_w \\ 0 \forall c > P_w + N \\ 0 \forall d \leq P_h \\ 0 \forall d > P_h + M \\ I_{ij} \text{ where } c = i + P_w; d = j + P_h; i = 1 \ldots N; j = 1 \ldots M \end{cases}$$

and providing a matrix P as output, wherein the matrix P has size $$\left(\frac{N - S + 2P_w}{W_w} + 1\right) \times \left(\frac{M - T + 2P_h}{W_h} + 1\right),$$

where $W_w$ and $W_h$ define the stride width and each entry $P_{ij}$ of the matrix P is the value of the inner product of the ij-th reduced matrix R with the predefined kernel, wherein the matrix P is provided as output by the depthwise convolutional layer to the first batch normalizer.

8. The method of claim 7, wherein:
   a) the size S and T of the predefined kernel is equal for all depthwise convolutional layers; or
   b) the size S and T of the predefined kernel is different for at least one depthwise convolutional layer and/or for at least one of the entries in the predefined kernel $S_{a'b'} \neq S_{a \neq a', b \neq b'}$.

9. The method of claim 6, further comprising:
providing, by the batch normalizer to the rectified linear unit, a normalized reduced matrix P';
applying, by the rectified linear unit, a rectification function to each entry of the normalized reduced matrix $P'_{ij}$ wherein the rectification function calculates a new matrix $\overline{P}$ with entries $$\overline{P}_{ij} = \begin{cases} 0 \forall P'_{ij} < 0 \\ P'_{ij} \forall P'_{ij} \geq 0 \end{cases};$$

responsive to determining that the rectified linear unit is the first rectified linear unit, providing the new matrix $\overline{P}$ as output to the pointwise convolutional layer, wherein the pointwise convolutional layer applies a weight to each matrix received from the preceding layer; and responsive to determining that the rectified linear unit is the second rectified linear unit, providing the new matrix as output to the next layer of the neural network.

10. The method of claim 1, wherein the method is performed on the mobile device.

11. A mobile device comprising an optical sensor, a processor and a storage unit storing executable instructions that, when executed by the processor of the mobile device, cause the processor to execute instructions to distinguish a real three-dimensional object from a two-dimensional spoof of the real object, the instructions comprising:
obtaining, by the optical sensor of the mobile device, an image, wherein the image contains an object that is either the two-dimensional spoof or the real three-dimensional object;
providing the image to a neural network;
processing the image by the neural network by:
calculating at least one of: 1) a distance map representative of a distance of a plurality of pixels to the optical sensor, the pixels constituting at least a first portion of the object within the image; or 2) a reflection pattern representative of light reflection associated with a plurality of pixels constituting at least a second portion of the object within the image; and
comparing at least one of the distance map or the reflection pattern with a learned distance map or a learned reflection pattern to determine, based on an outcome of the comparison, that the object in the image is either the two-dimensional spoof or the real three-dimensional object;
wherein the neural network comprises a plurality of layers and a last layer of the plurality of layers comprises two nodes, further comprising:
providing, by a first node, a first output regarding a real object being determined during the processing; and
providing, by a second node, a second output regarding a spoof being determined during the processing;
wherein each node provides an output upon processing of the image, wherein the output ranges from $-\infty$ to $+\infty$, and wherein the output of each node is passed to an output normalizer, wherein the output normalizer takes the output $x_i$ of each node and calculates a reduced value $S(x_i)$ by $$S(x) = \frac{e^x}{1+e^x}$$

where i=1 for the first node and i=2 for the second node, and provides the values $S(x_i)$ to a normalization function $$\sigma(S(x_j)) = \frac{e^{S(x_j)}}{\Sigma_i e^{S(x_i)}}$$

to obtain normalized values $\sigma(S(x_1)) \equiv \sigma_1$ and $\sigma(S(x_2)) \equiv \sigma_2$.

12. The method of claim 9, wherein the pointwise convolutional layer applies a weight $\alpha$ to the matrix I, P, P' or received from the preceding layer by multiplying each entry in the matrix P, P' or $\overline{P}$ with the weight $\alpha$.

13. The mobile device of claim 11, wherein obtaining, by the optical sensor of the mobile device, the image comprises:
obtaining the image using a flash associated with the optical sensor, wherein the optical sensor is a camera.

14. The mobile device of claim 11, further comprising:
responsive to determining that $\sigma_1 > 0.5$, determining that the image contains the real three-dimensional object; and
responsive to determining that $\sigma_2 > 0.5$, determining that the image contains the two-dimensional spoof.

15. The mobile device of claim 11, wherein processing the image by the neural network comprises:
processing, by a first layer of the neural network, the image to create a first intermediate output;
processing, by each following layer, the first immediate output of a preceding layer, wherein the neural network comprises the plurality of layers, wherein each layer is a depthwise separable convolution comprising, in a processing order of the input within the layer, a depthwise convolutional layer, a first batch normalizer, a first rectified linear unit, a pointwise convolutional layer, a second batch normalizer and a second rectified linear unit; and
obtaining as the output, by processing the image using the plurality of layers, the determination that the image contains either the real three-dimensional object or the two-dimensional spoof.

16. The mobile device of claim 15, wherein processing the image by the neural network comprises:
creating, from the image, at least one matrix I; and
providing the at least one matrix I as input to the neural network, wherein the image comprises pixels and the matrix I is a matrix comprising N×M values, wherein entries of the matrix I are given by $I_{ij}$, where i and j are integers and i=1 . . . N and j=1 . . . M.

* * * * *